United States Patent
Girard et al.

(10) Patent No.: US 8,565,439 B2
(45) Date of Patent: Oct. 22, 2013

(54) METHOD FOR DETECTING THE SCRAMBLING OF A RADIOCOMMUNICATION NETWORK, AND CORRESPONDING STORAGE MEANS AND CIRCUIT

(75) Inventors: Erwan Girard, Igny (FR); Christophe Flechelle, Colombes (FR); Thierry Lys, Paris (FR)

(73) Assignee: Sierra Wireless, Issy-les-Moulineaux Cedex (FR)

( * ) Notice: Subject to any disclaimer, the term of this patent is extended or adjusted under 35 U.S.C. 154(b) by 584 days.

(21) Appl. No.: 12/668,966

(22) PCT Filed: Jul. 11, 2008
(Under 37 CFR 1.47)

(86) PCT No.: PCT/EP2008/059106
§ 371 (c)(1),
(2), (4) Date: Nov. 15, 2010

(87) PCT Pub. No.: WO2009/010470
PCT Pub. Date: Jan. 22, 2009

(65) Prior Publication Data
US 2012/0170754 A1 Jul. 5, 2012

(30) Foreign Application Priority Data
Jul. 13, 2007 (FR) .................................... 07 56477

(51) Int. Cl.
*H04K 1/00* (2006.01)

(52) U.S. Cl.
USPC ............. 380/287; 342/352; 342/16; 343/703; 455/1; 455/63.1; 340/854.6; 370/503; 370/507; 370/510; 370/524; 370/350

(58) Field of Classification Search
USPC ......... 380/287; 342/352, 16; 343/703; 455/1, 455/63.1; 340/854.6
See application file for complete search history.

(56) References Cited

U.S. PATENT DOCUMENTS

| | | | |
|---|---|---|---|
| 4,612,546 A | | 9/1986 | Rosen |
| 5,404,161 A | * | 4/1995 | Douglass et al. ............... 725/15 |

(Continued)

FOREIGN PATENT DOCUMENTS

| | | | |
|---|---|---|---|
| WO | WO 2005/112321 | * | 5/2005 |
| WO | 2005112321 A1 | | 11/2005 |

OTHER PUBLICATIONS

Suzuki, H.;et al.; Digital Portable Transceiver Using GMSK Modem and ADM Codec; 1984. vol. 2 ,Iss.4;p. 604-610; Selected Areas in Communications, IEEE Journal on (0733-8716).*

(Continued)

*Primary Examiner* — Luu Pham
*Assistant Examiner* — Angela Holmes
(74) *Attorney, Agent, or Firm* — David D. Brush; Westman, Champlin & Kelly, P.A.

(57) ABSTRACT

A method is provided for detecting scrambling of a radiocommunication network. The method is applied by a radiocommunication circuit capable of being connected to the network by being synchronized on a radiocommunication channel. The method includes a final detection phase, having the following steps: detection of verification of the following final condition: there are N radiocommunication channels on which the radiocommunication circuit cannot be synchronized despite detection of a power level normally sufficient for being synchronized, where N>2; and if the final condition is verified, generation of a final scrambling signal with a probability of scrambling equal to 100%. The method also includes at least one intermediate detection phase, having the following steps: detection of verification of at least one intermediate condition; and if the at least one intermediate condition is verified, generation of an intermediate scrambling signal with a probability of scrambling of less than 100%.

13 Claims, 3 Drawing Sheets

(56) References Cited

U.S. PATENT DOCUMENTS

| | | | |
|---|---|---|---|
| 6,597,729 B1 * | 7/2003 | Schmidl et al. | 375/149 |
| 6,791,466 B1 * | 9/2004 | Chang et al. | 340/4.21 |
| 6,801,567 B1 * | 10/2004 | Schmidl et al. | 375/149 |
| 6,917,643 B2 * | 7/2005 | Imura | 375/140 |
| 7,023,831 B2 * | 4/2006 | Okuyama | 370/342 |
| 7,061,966 B2 * | 6/2006 | Storm et al. | 375/145 |
| 7,236,468 B2 * | 6/2007 | Ryu et al. | 370/320 |
| 7,315,566 B2 * | 1/2008 | Tanno et al. | 375/142 |
| 7,664,524 B2 * | 2/2010 | Katoh | 455/525 |
| 7,760,793 B2 * | 7/2010 | Parts et al. | 375/145 |
| 7,996,747 B2 * | 8/2011 | Dell et al. | 714/776 |
| 2001/0014113 A1 * | 8/2001 | Imura | 375/141 |
| 2002/0064146 A1 * | 5/2002 | Okuyama | 370/342 |
| 2002/0075833 A1 * | 6/2002 | Dick et al. | 370/336 |
| 2003/0152178 A1 * | 8/2003 | Tanno et al. | 375/354 |
| 2003/0169702 A1 * | 9/2003 | Ryu et al. | 370/320 |
| 2004/0170221 A1 * | 9/2004 | Storm et al. | 375/149 |
| 2005/0239459 A1 * | 10/2005 | Katoh | 455/432.1 |
| 2007/0116166 A1 * | 5/2007 | Parts et al. | 375/354 |
| 2008/0109707 A1 * | 5/2008 | Dell et al. | 714/776 |

OTHER PUBLICATIONS

De Gaudenzi, R.; et. al.; Advances in satellite CDMA transmission for mobile and personal communications; 1996. vol. 84, Iss.1;p. 18-39; Proceedings of the IEEE (0018-9219).*

French Search Report dated Dec. 27, 2007 for corresponding French Application No. FR0756477 filed Jul. 13, 2007.

International Preliminary Report on Patentability and Written Opinion dated Dec. 12, 2008 for corresponding International Application No. PCT/EP2008/059106 filed Jul. 11, 2008.

International Search Report dated Dec. 12, 2008 for corresponding International Application No. PCT/EP2008/059106, filed Jul. 11, 2008.

* cited by examiner

METHOD FOR DETECTING THE SCRAMBLING OF A RADIOCOMMUNICATION NETWORK, AND CORRESPONDING STORAGE MEANS AND CIRCUIT

CROSS-REFERENCE TO RELATED APPLICATIONS

This Application is a Section 371 National Stage Application of International Application No. PCT/EP2008/059106, filed Jul. 11, 2008 and published as WO 2009/010470 on Jan. 22, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiocommunication systems making it possible for radiocommunication devices to connect to radiocommunication networks.

By radiocommunication devices (also called radiocommunication terminals or wireless terminals), is meant all devices or means that are capable of exchanging signals using a radiocommunication system, implanted for example in machines (M2M market, for "Machine to Machine") or vehicles (automobile market).

The field of application of the disclosure covers all cellular radiocommunication technology (GSM, 3G, 4G, DECT, CDMA, Wi-Max, etc.), point-point radiocommunication (Wifi, Bluetooth, Zigbee, etc.) or analog radiocommunication.

More precisely, the disclosure relates to a technique for detecting the scrambling of a radiocommunication network by a radiocommunication circuit capable of connecting to this network by being synchronized on a radiocommunication channel.

The disclosure applies in particular, but not exclusively, in the case where the radiocommunication circuit is an electronic radiocommunication module (also called "communicating module") intended to be incorporated into a radiocommunication device. This entails for example a module of the "WISMO" (registered trademark) family of the WAVECOM company (applicant for this patent application). The WAVECOM company has indeed for several years proposed an approach consisting in grouping together in a single module (called electronic radiocommunication module), all or at least most of the functions of a digital radiocommunication device. Such a module has the form of a single case, preferably shielded, that the manufacturers of devices can implant directly, without having to take into account a multitude of components. This module (sometimes still called "macro component") is indeed formed of a regrouping of several components on a substrate, in such a way as to be implanted in the form of a single element. It comprises the main components (in particular a processor, memories, and software) that are required for the operation of a radiocommunication device using radio frequencies. Therefore, there are no longer any complex steps in the designing and in the validation of the latter. It is enough to reserve the place required for the module. Such a module can therefore make it possible to integrate easily, rapidly and in an optimized manner all of the components in wireless terminals (portable telephones, modems, or any other device making use of a wireless standard).

In an alternative application of the disclosure, the radiocommunication circuit is not a radiocommunication module in the aforementioned sense but a printed circuit contained in a radiocommunication device and whereon are directly implanted a set of electronic components having for purpose to provide the various required radiocommunication functions, from the receiving of an RF signal until the generation of an audible signal (in the case of a wireless telephone), and inversely.

BACKGROUND OF THE DISCLOSURE

Today, several manufacturers propose radiocommunication circuits (communicating modules) that have the capacities for detecting scrambling to their customers.

The current technique for detecting scrambling by these radiocommunication circuits consists in carrying out a complete diagnostic of the radio environment and, according to the result of this diagnostic, in providing a status of the type: "the network is scrambled" or "the network is not scrambled".

The problem with the current technique is that the complete diagnostic of the radio environment takes a non-negligible amount of time. The consequence is that, when a scrambling is detected, the corrective actions (in general linked to security) can in certain cases be launched too late.

This problem is now shown by using the example of devices for recovering stolen cars. Typically, such a device comprises:

a radiocommunication circuit (for example a GSM module), making it possible to communicate with a theft management server in order to roll up/recover information;

a GPS module, making it possible to obtain the position of the vehicle; and a security module, making it possible to immobilize the vehicle (activation of an ignition cut-off), trigger an alarm or carry out any other action making it possible to limit the access or the use of the vehicle by the possible thief.

If the radiocommunication circuit does not support the capacity for detecting scrambling, the device for recovering can be rendered entirely ineffective by the simple presence ad vitam of a scrambler which can be connected to the cigarette lighter. Indeed, if the device has not detected the intrusion and the theft of the car, no longer receiving any message via the radiocommunication network, it can no longer be informed by the theft management server that the car is stolen and as such cannot activate the ignition cut-off or the alarm, and is therefore completely ineffective.

If the radiocommunication circuit supports the capacity for detecting scrambling, the supplying by the radiocommunication circuit of the "the radiocommunication network is scrambled" information can take several dozens of seconds. Indeed, as indicated hereinabove, during the loss of synchronization with the radiocommunication network, the radiocommunication circuit launches a complete diagnostic of the radio environment and at the end of this diagnostic provides its conclusion: "the radiocommunication network is scrambled" or "the radiocommunication network is not scrambled". This diagnostic can take 40 seconds in the case of a GSM network for example. During this time, the thief can enter into the car and start it. Or, once the car is started, the device, for obvious reasons of road safety, is no longer legally authorized to trigger the ignition cut-off. On the other hand, as it is scrambled, the radiocommunication circuit can no longer communicate with the theft management server. The thief can therefore drive the car to a secluded area, where he can easily find the device for recovering stolen cars and deactivate it.

This discussion, provided simply by way of an illustrative example, can of course be transposed to other applications based on a radiocommunication circuit: alarms, systems for following ("tracking") containers, etc.

Patent application WO 2005/112321 A1 (filed by the DAI TELECOM company) has an example of implementing the aforementioned current technique for detecting scrambling. The complete diagnostic of the radio environment carried out by the radiocommunication circuit consists in:
  detecting the verification of the following condition: there is a number DCMN ("Disturbed Channels Minimum Number") of radiocommunication channels whereon the radiocommunication circuit cannot be synchronized despite the detection of a power level greater than a predetermined MNPL threshold ("Maximum Noise Power Level") above which it is normally possible to be synchronized;
  if said condition is verified, generation of a scrambling signal, in the form of a JDR message ("jammed condition report") which is transmitted to the base station, for example via a RACH access channel ("Random Access Channel") or PRACH ("Packet Random Access Channel").

The parameter DCMN is frozen (for example at 5). The parameter MNPL is also frozen, and fixed by the operator of the network, for each cell. These two parameters are used to finely adjust the algorithms for detecting scrambling, and their values are factory-adjusted and must not normally be modified (except if the mobile is installed in a particular environment, the default values can then be modified in order to be adapted to this particular environment).

It is important to note that in the current technique (including that of application WO 2005/112321 A1), the detecting of scrambling comprises a single detection phase of the complete diagnostic of the radio environment. The decision taken at the end of this single detection phase is therefore a final decision. In other terms, at the end of the complete diagnostic, the result provided is:
  either a signal indicating that "the network is not scrambled", with a probability of scrambling of 0%;
  either a signal (called scrambling signal) indicating that "the network is scrambled", with a probability of scrambling of 100%.

As such, in the current technique, the choice of the number of radiocommunication channels "that cannot be synchronized" whereon is taken the decision for detecting scrambling (i.e. the parameter DCMN in the particular case of application WO 2005/112321 A1) is not optimal since it is the result of a compromise between on the one hand the reliability of the detecting of scrambling and on the other hand the rapidity of the decision:
  this number (DCMN) must not be too small, which could result in the triggering of false detections of scrambling (it may be normal that there are a few radiocommunication channels whereon the radiocommunication circuit cannot be synchronized, but that does not necessarily means that a synchronization is not possible on another radiocommunication channel);
  this number (DCMN) must not be too big, which could result in the complete diagnostic of the radio environment taking a period of time that is too long.

The current technique (including that of application WO 2005/112321 A1) is therefore not optimal since it either favors a decision (of detection of scrambling) that is rapid but to the detriment of quality, or it favors a sure decision but which may be too slow.

Furthermore, the current technique, due to the fact that no decision relative to a possible scrambling is taken before the end of the complete diagnostic of the radio environment, does not allow for the launching of preventive actions.

SUMMARY

In a particular embodiment of the invention, a method for detecting the scrambling of a radiocommunication network is proposed, said method being implemented by a radiocommunication circuit capable of connecting to said network by being synchronized on a radiocommunication channel, said method comprising:
  a final detection phase, comprising the following steps:
    detection of the verification of the following final condition: there exists N radiocommunication channels whereon the radiocommunication circuit cannot be synchronized despite the detection of a power level normally sufficient for being synchronized, with $N \geq 2$;
    if said final condition is verified, generation of a final scrambling signal with a probability of scrambling equal to 100%;
  at least one intermediate detection phase, comprising the following steps:
    detection of the verification of at least one intermediate condition;
    if said at least one intermediate condition is verified, generation of an intermediate scrambling signal with a probability of scrambling less than 100%.

The general principle of an embodiment of the invention therefore consists in providing at least one intermediate detection phase, making it possible to generate an intermediate scrambling signal with a probability of scrambling less than 100%. This intermediate scrambling signal makes it possible to trigger at least one intermediate action (also called a preventive action due to the fact that it is carried out before the final scrambling signal is generated, with a probability of scrambling equal to 100%). As such, in the event of effective scrambling, the making of a decision is accelerated and the launching of preventive actions is made possible (taking into account the fact that the probability of scrambling is less than 100%).

In this particular embodiment, the invention is therefore based on an approach that is entirely new and inventive consisting in carrying out a detection of scrambling in several phases (instead of a single one in the aforementioned current technique), by using at least one intermediate condition associated to an intermediate scrambling signal with a probability less than 100%.

For the choice of the number N of radiocommunication channels "that cannot be synchronized" whereon is taken the decision for detecting scrambling (number N associated to a probability of scrambling of 100%), the compromise between the reliability of the detecting of scrambling and the rapidity of the decision is overcome. Indeed, can be taken:
  a number N that is greater than that generally taken in the current technique (for specification, in the application WO 2005/112321 A1, we have: N=DCMN=5), in order to obtain a reliable final decision (final scrambling signal with a probability of 100%); and nevertheless benefit from a rapidity of the decision (for the launching of preventive actions), thanks to the intermediate scrambling signal(s) each with a probability less than 100%.

Advantageously, said method comprises a first intermediate detection phase, comprising the following steps:

detection of the verification of the following first intermediate condition: loss of synchronization on all of the synchronized cells although the reception strength levels detected on these cells has not dropped;

if said first intermediate condition is verified, generation of a first intermediate scrambling signal with a first probability of scrambling less than 100%.

As such, before even starting to attempt a synchronization on the radiocommunication channels (i.e. before launching the diagnostic of the radio environment properly speaking), a first scrambling detection signal is available. Even if the latter is generated with a very low probability of scrambling (for example of a magnitude of 1%), it makes it possible to launch one or several first preventive actions.

Advantageously, said method comprises a second intermediate detection phase, comprising the following steps:

detection of the verification of the following second intermediate condition: for all or at least one predetermined proportion of the radiocommunication channels of which the frequency is comprised in at least one band of operation of the radiocommunication circuit, detection of a power level greater than a determined threshold;

if said second intermediate condition is verified, generation of a second intermediate scrambling signal with a second probability of scrambling less than 100%.

As such, still without having started to attempt a synchronization on the radiocommunication channels, a second scrambling detection signal is available. Like the first scrambling detection signal, even if it is generated with a very low probability of scrambling (for example of a magnitude of a few percentage points), it makes it possible to launch one or several second preventive actions.

Note that said first and second detection phases can be implemented in a complementary or separate manner.

According to an advantageous characteristic, said determined threshold is equal to a minimum power level for the synchronization of the radiocommunication circuit.

Advantageously, said method comprises at least one third intermediate detection phase, comprising the following steps:

detection of the verification of the following third intermediate condition: there exists $N'$ radiocommunication channels whereon said radiocommunication circuit cannot be synchronized despite the detection of a power level normally sufficient for being synchronized, with $N'<N$;

if said third intermediate condition is verified, generation of a third intermediate scrambling signal with a third probability of scrambling less than 100%.

As such, one or several third intermediate detection phases can be carried out, each one being associated to a number $N'$ that is different and making it possible to generate a scrambling detection signal with a different probability of scrambling (this probability being all the more so high as the number $N'$ is large).

According to a particular embodiment, said $N'$ radiocommunication channels are comprised in the last list, received by the radiocommunication circuit, of radiocommunication channels associated to neighboring cells of the last current cell before a loss of synchronization.

Recall that in the case of a GSM network, the GSM module (radiocommunication circuit in the aforementioned sense) is synchronized on a current cell (via the base station with which it is communicating), as well as on a maximum of six neighboring cells (via the base stations with which it is not communicating). It periodically listens to these cells and carries out measurements of power on a maximum of 32 frequencies, according to the recommendations written in the specification 3GPP 05.08. As such, in the case of GSM, the "last list" received by the GSM module is the list of these at most six neighboring cells.

Advantageously, in the case of the aforementioned particular embodiment, said method comprises:

at least one fourth intermediate detection phase, comprising the following steps:

detection of the verification of the following fourth intermediate condition: there exists $N''$ radiocommunication channels whereon said radiocommunication circuit cannot be synchronized despite the detection of a power level normally sufficient for being synchronized, with $N'<N''<N$;

if said fourth intermediate condition is verified, generation of a fourth intermediate scrambling signal with a fourth probability of scrambling less than 100% and greater than said third probability of scrambling;

and said $N''$ radiocommunication channels include:

said $N'$ radiocommunication channels; and radiocommunication channels that are not included in said last list of radiocommunication channels.

In other terms, the radiocommunication circuit tries to be synchronized not only on the radiocommunication channels of the neighboring cells but also one the radiocommunication channels of other cells.

In a first particular embodiment of the invention, said radiocommunication circuit executes a client application, and in that said method comprises a step of transmitting to said client application of at least one of said intermediate scrambling signals generated by said radiocommunication circuit, so that said client application can take this into account in order to take a decision of triggering of at least one intermediate action.

In a second particular embodiment of the invention, said method comprises a step of transmitting to a remote equipment, via said radiocommunication network or via another communication network, of at least one of said intermediate scrambling signals generated by said radiocommunication circuit, so that said remote equipment can take this into account in order to take a decision of triggering of at least one intermediate action.

Note that, in the first as in the second particular embodiment, the decision of triggering of said at least one intermediate action can depend on parameters other than the intermediate scrambling signal(s).

In an advantageous alternative, at least one particular intermediate action, of which the decision of triggering is the result of a taking into account of at least one of said intermediate scrambling signals, consists in interrupting said method before the execution of detection phase(s) that are not yet executed, including said final detection phase.

In other terms, it can be decided, according to predetermined criteria (comprising at least the existence of one or several predetermined intermediate scrambling signals), to interrupt the method of detection without waiting for the generation of the final detection signal (i.e. that generated with a probability equal to 100%).

As such, in this alternative, the method is interrupted without waiting for the scrambling to be detected with a probability of 100%. Recall that in the technique of prior art, there is a single detection phase (at the end of which is generated a scrambling signal with a probability of 100%), and it is therefore not possible to interrupt the method of detection as long as the probability of 100% has not been reached.

According to a particular characteristic, said circuit is an electronic radiocommunication module intended to be incorporated into a radiocommunication device.

In another embodiment, the invention relates to a storage means that can be read by a computer, storing a set of instructions that can be executed by said computer in order to implement the aforementioned method.

In another embodiment, the invention relates to a radiocommunication circuit comprising means of detecting the scrambling of a radiocommunication network, said radiocommunication circuit being able to connect to said network by being synchronized on a radiocommunication channel, said radiocommunication circuit comprising:
  a means for making a final decision, comprising:
    means of detecting the verification of the following final condition: there exists N radiocommunication channels whereon the radiocommunication circuit cannot be synchronized despite the detection of a power level normally sufficient for being synchronized, with $N \geq 2$;
    means of generating a final scrambling signal with a probability of scrambling equal to 100%, activated if said condition finale is verified;
  at least one means for making an intermediate decision, comprising:
    means for detecting the verification of at least one intermediate condition;
    means for generating an intermediate scrambling signal with a probability of scrambling less than 100%, activated if said at least one intermediate condition is verified.

More generally, the radiocommunication circuit according to an embodiment of the invention comprises means for implementing the method for detecting scrambling such as described hereinabove (in any one of its various embodiments).

BRIEF DESCRIPTION OF THE DRAWINGS

Other characteristics and advantages of embodiments of the invention shall appear when reading the following description, provided as an indication and in a non-restrictive manner (all of the embodiments of the invention are not limited to the characteristics of the embodiments described hereinafter), and the annexed drawings, wherein.

DETAILED DESCRIPTION OF ILLUSTRATIVE EMBODIMENTS

The rest of the description is situated in the case where the radiocommunication circuit is an electronic radiocommunication module. It entails for example a module of the "WISMO" (registered trademark) family implementing the "Open AT" (registered trademark) concept of the WAVECOM company (applicant for this patent application). It is clear however that this invention also applies in the case of the aforementioned alternative application.

Figure 1:
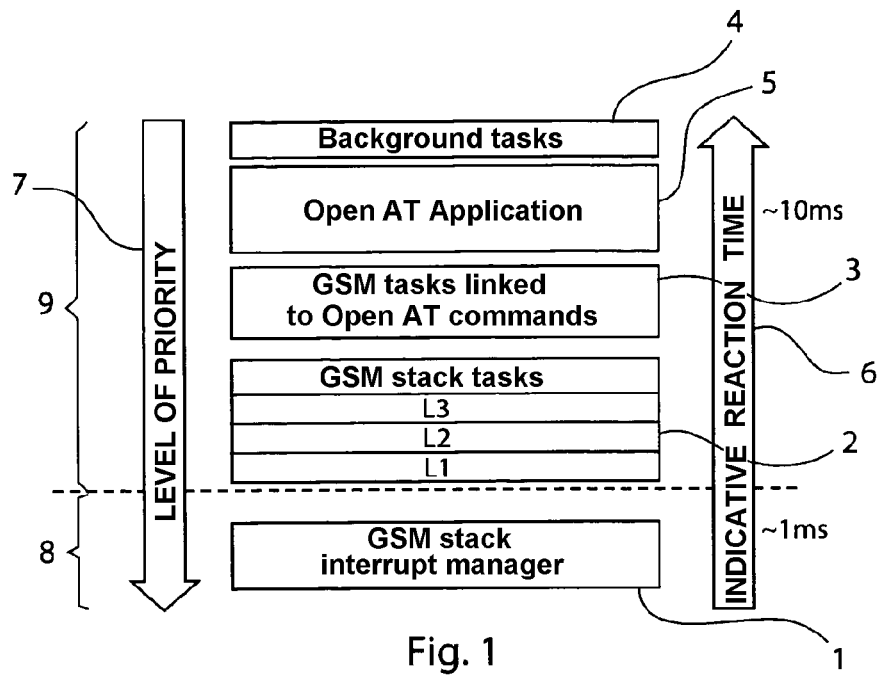
FIG. 1 shows a known software architecture, of a GSM stack supporting the capacity of executing at least one client application.

In relation with FIG. 1, a known software architecture is now shown making it possible to embark external code on a radiocommunication platform (or "Wireless platform").

This software architecture typically comprises a radiocommunication software stack (in the example in FIG. 1, a GSM stack) comprising:
  a radiocommunication interrupt manager 1 ("GSM Stack IT Handler"), which provides physical link services and provides the synchronization with the GSM network. It corresponds to the GSM physical layer;
  a set of tasks 2 specific to the GSM stack ("GSM Stack Tasks L1-L3"), distributed into layers (L1 to L3), and which provides a logical link and control service. In the GSM standard, it corresponds to L1/L2/L3, RR/LAPD/MM/CCRLC/MAC/LLC/SNDCP/SM;
  a set of tasks 3 linked to AT commands ("GSM AT Commands Task"), which provide a GSM stack control service. In the GSM standard, it corresponds to the Application layer; and
  a task 4 called "Idle Task" or "Background task" which is executed when no other task is requesting the CPU resources.

This software architecture further comprises at least one client application 5 (in this example a single "Open AT" application), comprising a set of client tasks. Within the GSM stack, this client application 5 is positioned between the set of tasks 3 linked to AT commands and the background task 4. The arrow referenced as 6 indicates an axis of indicative reaction time (from approximately 1 ms to approximately 10 ms). The arrow referenced as 7 indicates an axis of priority level (from the background task 4, which has the least priority, to the radiocommunication interrupt manager 1, which has the highest priority).

This software architecture can also be broken down into two domains:
  a domain 8 for managing interrupts, wherein is included the radiocommunication interrupt manager 1; and
  a domain 9 for managing tasks, wherein are included all of the aforementioned tasks (tasks 2 specific to the GSM stack, tasks 3 linked to AT commands, background task 4 and tasks of the client application 5).

As such, with this known structure, any client application can be executed by the radiocommunication module while still guaranteeing the proper operation of the GPRS/GSM stack.

In the example shown in FIG. 1, the software architecture comprises a single client application 5. It is clear however that those skilled in the art can easily transpose this example in the case where the software architecture comprises a GSM stack and several applications client (each client application comprising a set of client tasks and being positioned, within the GSM stack, between the set of tasks 3 linked to AT commands and the background task 4).

Figure 2:
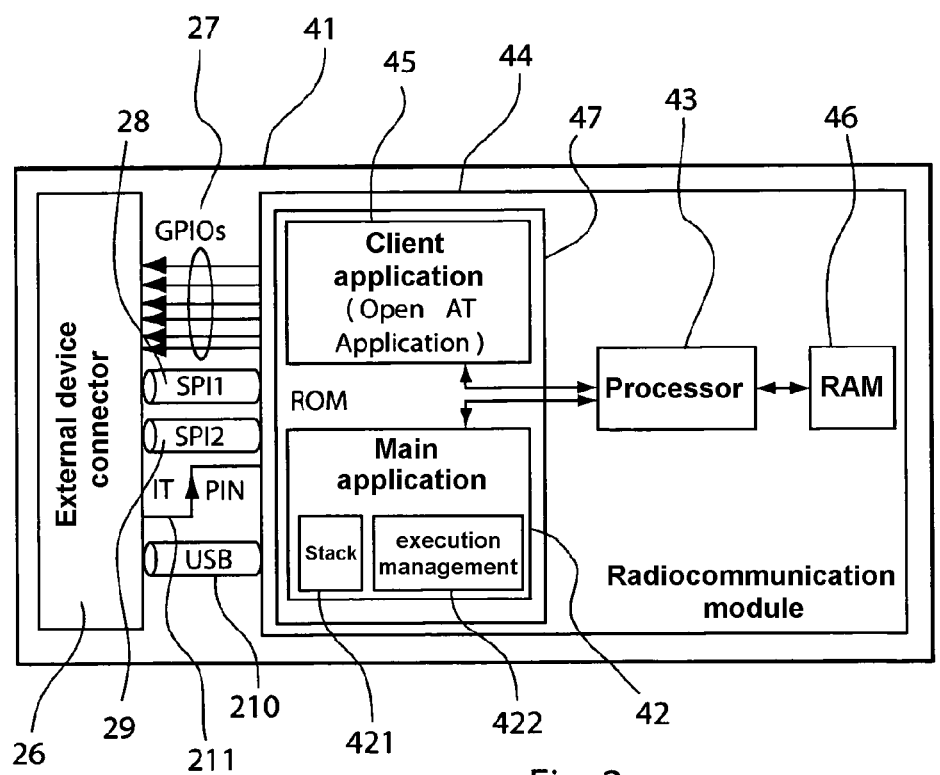
FIG. 2 shows a particular embodiment of a device for radiocommunication according to an embodiment of the invention, comprising a radiocommunication module having a software architecture according to FIG. 1.

In relation with FIG. 2, a particular embodiment of a device for radiocommunication according to the invention is now presented.

It comprises a motherboard 41 whereon is implanted a radiocommunication module 44 having a software architecture according to the FIG. 1, obtained by execution by a processor 43 (and a RAM memory 46) of:
- a main radiocommunication application 42 comprising a software block 421 which handles the radiocommunication software stack (GSM stack for example) and a software block 422 which makes it possible to implement the method of an embodiment of the invention (making it possible to detect the scrambling of the radiocommunication network); and
- a client application 45.

It is important to note that the method according to an embodiment of the invention, which is embarked in the radiocommunication module 44, does not disturb in any way the radiocommunication network (cellular network). Its implementation remains compliant from a network standpoint with ETSI/3GPP recommendations.

The main radiocommunication application 42 and the client application 45 are for example stored in a read-only memory 47 (ROM for example) and, at the initialization of the radiocommunication module 44, the code instructions of these applications are loaded into a random-access memory 46 (RAM for example) before being executed by the processor 43.

Moreover, the radiocommunication module 44 is connected to a connector 26 for external devices, via general purpose Input/Output interfaces (GPIOs) 27, serial interfaces of the SPI type (Serial Peripheral Interface) (SPI1, SPI2) 28 and 29, a USB interface 210 and a link carrying interruptions (IT) 211.

Figure 3:
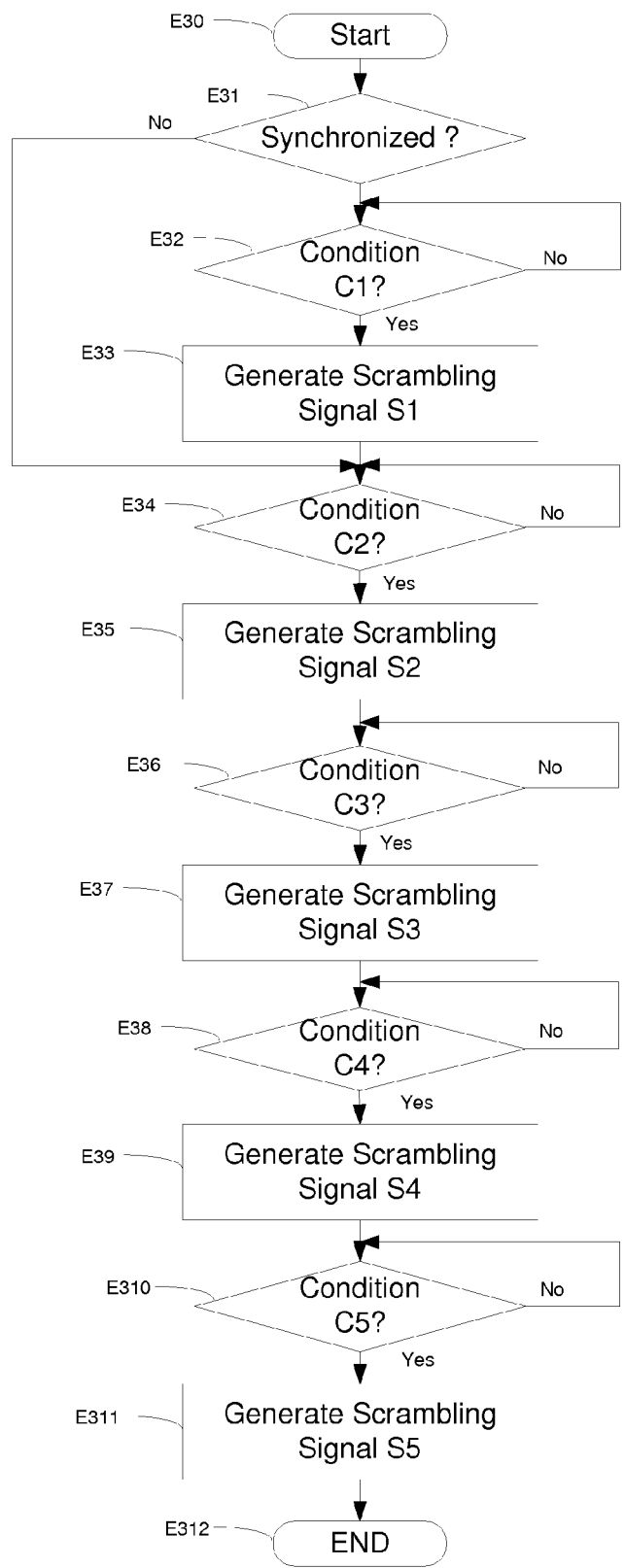
FIG. 3 shows a flow chart of an example of an algorithm according to a particular embodiment of the method for detecting scrambling according to an embodiment of the invention, executed by the main application (and more precisely in the software block 422) appearing in the FIG. 2.

In relation with FIG. 3, an example of an algorithm is now shown according to a particular embodiment of the method for detecting scrambling according to the invention, executed by the main application 42 (and more precisely by the software block 422) appearing in the FIG. 2.

In what follows, it is assumed that a scrambling is detected with a probability of scrambling of 100% if there exists N radiocommunication channels whereon the radiocommunication module cannot be synchronized despite the detection of a power level normally sufficient for being synchronized, with $N2 \geq 2$.

In a starting step E30, it is assumed that the radiocommunication module 44 is synchronized (on a radiocommunication channel carried by a radiocommunication carrier, called BCCH carrier in GSM terminology (for "Broadcasting Control CHannel") or is not synchronized but the strength level detected on all of the radiocommunication channels is not high enough in order to allow for a synchronization.

In a step E31, it is detected whether or not the radiocommunication module 44 is synchronized. In the event it is synchronized, control passes to the step E32. In the event it is not synchronized (but the strength level detected on all of the radiocommunication channels is not high enough to allow for a synchronization), control passes directly to the step E34.

In step E32, it is detected whether the following condition C1 is verified: loss of synchronization on all of the synchronized cells although the reception strength levels detected on these cells have not dropped. The number n of synchronized cells is for example such that: $1 \leq n \leq 7$.

If this condition C1 is verified, control passes to a step E33 of generating a first intermediate scrambling signal S1 with a first probability of scrambling P1 less than 100%. Then control passes to a step E34. Otherwise, control passes back to the step E32.

The signal S1 is for example generated in a duration D1 such that:

$$D1 = 6 s + (n-1)*1 s$$

The probability P1 is for example such that: $P1 = 10*(n/7)\%$

The steps E32 and E33 form a first intermediate detection phase.

In step E34, it is detected whether the following condition C2 is verified: for all or at least a predetermined proportion of the radiocommunication channels of which the frequency (BCCH carrier, in the GSM case) is comprised in at least one band of operation of the radiocommunication circuit, detection of a power level greater than a determined threshold. In a particular embodiment (GSM context), this threshold is equal to −105 dBm, i.e. the minimum power level for the synchronization of the radiocommunication module.

Recall that, normally, when a radiocommunication module tries to find a frequency at the start or during the loss of synchronization on all of the synchronized cells, it must carry out measurements of power on all of the frequencies whereon it is capable of operating. However, in a normal radio environment (i.e. not scrambled), there are frequencies for which the power level is less than −105 dBm (for example because the base stations emitting these frequencies are far away from the place where the radiocommunication module is located). If, during the measurement campaign, the radiocommunication module detects in the frequency band(s) only power levels greater than −105 dBm, it can then be considered that the radiocommunication module is in a highly noisy environment and consequently suspect a voluntary or involuntary scrambling.

If this condition C2 is verified, control passes to a step E35 of generating a second intermediate scrambling signal S2 with a second probability of scrambling P2 less than 100% and greater than P1. Then control passes to a step E36. Otherwise, control passes back to the step E34.

The signal S2 is for example generated in a duration D2 such that: $D2 = 5 s$.

The probability P2 is for example such that: $P2 = P1 + 25\%$.
$P1 = 0\%$ if this is coming from the state E30 without having passed via the condition C1.

5 s is the maximum time authorized by 3GPP 05.08 ($6.2) to carry out 5 samples of measurements over all of the frequencies.

The steps E34 and E35 form a second intermediate detection phase.

In step E36, it is detected whether the following condition C3 is verified: there exists N' radiocommunication channels, among those associated to the neighboring cells (of the last current cell before loss of synchronization), whereon the radiocommunication module cannot be synchronized despite the detection of a power level normally sufficient for being synchronized, with $N' < N$. In other terms, the radiocommunication module tries to be synchronized on the frequencies BCCH included in the last list received of BCCH frequencies, and of which the power is greater than −105 dBm. These attempts are carried out for example in decreasing order of power.

If this condition C3 is verified, control passes to a step E37 of generating a third intermediate scrambling signal S3 with a third probability of scrambling P3 less than 100% and greater than P2. Then control passes to a step E38. Otherwise, control passes back to the step E36.

The signal S3 is for example generated in a duration D3 such that:

$$D3=N''*(0.5) \text{ s}$$

The probability P3 is for example such that:

$$P3=25+((1.5*N')/(1.5N'+(N-N')))*75$$

N' is the number of cells belonging to the neighborhood of the last carrier. A weighting of 1.5 is applied to these cellules in relation to (N−N') remaining cells. 0.5 s if the maximum time allowed by 3GPP 05.08 (§6.2) in order to synchronize a BCCH carrier in initial selection phase.

The steps E36 and E37 form a third intermediate detection phase.

In an alternative, this third phase of intermediate detection can be repeated several times. For example, it can be repeated twice, with numbers N'1 and N'2 (such that: N'1<N'2) and intermediate scrambling signals S31 and S32, generated with probability of scrambling P31 and P32 (such that: P31<P32).

In step E38, it is detected whether the following condition C4 is verified: there exists N" radiocommunication channels whereon the radiocommunication module cannot be synchronized despite the detection of a power level normally sufficient for being synchronized, with: N'<N"<N. The N" radiocommunication channels include the aforementioned N' radiocommunication channels (associated to the neighboring cells) and other radiocommunication channels (among those not associated to the neighboring cells).

If this condition C4 is verified, control passes to a step E39 of generating a fourth intermediate scrambling signal S4 with a fourth probability of scrambling P4 less than 100% and greater than P3. Then control passes to a step E310. Otherwise, control passes back to the step E38.

The signal S4 is for example generated in a duration D4 such that: $D4=N''*(0.5)$ s The probability P4 is for example such that:

$$P4=P2+((N'')/(1.5N'+N''))*75, \text{ where } N''=N-N'$$

0.5 s is the maximum time authorized by 3GPP 05.08 (§6.2) in order to synchronize a BCCH carrier in initial selection phase.

The steps E38 and E39 form a fourth intermediate detection phase.

In an alternative, this fourth intermediate detection phase can be repeated several times. For example, it can be repeated twice, with numbers N"1 and N"2 (such that: N"1<N"2) and intermediate scrambling signals S41 and S42, generated with probabilities of scrambling P41 and P42 (such that: P41<P42).

In step E310, it is detected whether the following condition C5 is verified: there exists N radiocommunication channels whereon the radiocommunication module cannot be synchronized despite the detection of a power level normally sufficient for being synchronized.

If this condition C5 is verified, control passes to a step E311 of generating a final scrambling signal S5 with a probability of scrambling P5 equal to 100%. Then control passes to an ending step E312.

The durations D2, D3 and D4 for generating signals S2, S3 and S4 are provided relatively in relation to the last signal generated.

Figure 4:
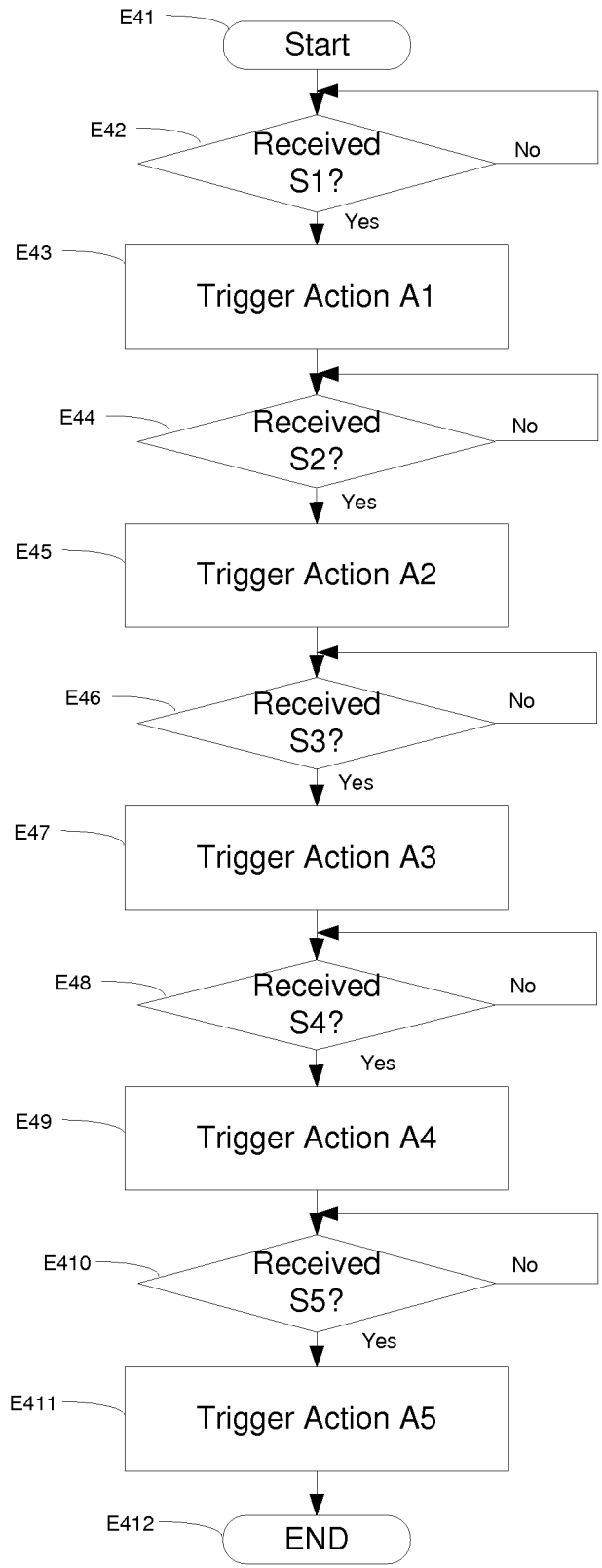
FIG. 4 shows an example of an algorithm according to a particular embodiment of the method for detecting scrambling according to an embodiment of the invention, executed by the client application appearing in the FIG. 2.

In relation with FIG. 4, an example of an algorithm is shown according to a particular embodiment of the method for detecting scrambling according to the invention, executed by the client application 45 appearing in the FIG. 2.

After a starting step E41, control passes to a step E42 wherein is detected the reception of the first intermediate scrambling signal S1 (see the step E33 in FIG. 3). In the event of positive detection in step E42, control passes to a step E43 for the triggering of at least one first intermediate action A1. Then control passes to a step E44. Otherwise, control passes back to the step E42.

In step E44, the reception of the second intermediate scrambling signal S2 is detected (see the step E35 in FIG. 3). In the event of positive detection in the step E44, control passes to a step E45 for the triggering of at least one second intermediate action A2. Then control passes to a step E46. Otherwise, control passes back to the step E44.

In the step E46, the reception of the third intermediate scrambling signal S3 is detected (see the step E37 in FIG. 3). In the event of positive detection in the step E46, control passes to a step E47 of triggering of at least one third intermediate action A3. Then control passes to a step E48. Otherwise, control passes back to the step E46.

In step E48, the reception of the fourth intermediate scrambling signal S4 is detected (see the step E39 in FIG. 3). In the event of positive detection in the step E48, control passes to a step E49 for the triggering of at least one fourth intermediate action A4. Then control passes to a step E410. Otherwise, control passes back to the step E48.

In step E410, the reception of the fifth intermediate scrambling signal S5 is detected (see the step E311 in FIG. 3). In the event of positive detection in the step E410, control passes to a step E411 for the triggering of at least one final action A5. Then control passes to an ending step E412.

In summary, at each step of the method for detecting scrambling, the client application can determine what behavior it can adopt taking into account the probability of scrambling with which is generated each scrambling signal.

In order to show the algorithm in FIG. 4 through an example, we shall take the case where the radiocommunication module is comprised in a device for recovering stolen cars. It is assumed that a thief approaches the desired car and connects his GSM scrambler in order to render inoperative the device for recovering stolen cars. At this moment, the radiocommunication module loses the synchronization with the GSM network abruptly, which could also be caused by the entry into a parking garage or the passing in a tunnel.

In this context, the actions A1 to A5 are for example the following:
   actions A1 and/or A2: the client application (which furthermore can know that the car is immobile) places itself in first-level defensive mode (increase in the calculating power of the processor in order to allow for a diagnostic of the situation at maximum speed; complete diagnostic of the breaking-in sensors of the car; etc.);
   action A3: the client application activates the ignition cut-off for a predetermined duration (for example 15 seconds) corresponding to the time for the diagnostic to the generation of the next intermediate scrambling signal by the scrambling detection algorithm according to an embodiment of the invention (see FIG. 3);
   action A4: maintain the activation of the ignition cut-off and the locking of the wheels;
   action A5: triggering of an alarm (local and/or remote).

At each of the steps of the algorithm for detecting scrambling according to an embodiment of the invention (see FIG. 3), if the probability of scrambling decreases during the diagnostic of the radio environment, then a release of the constraints placed on the car can be provided. The purpose is that all of the constraints be effective (therefore implemented very rapidly) and transparent for the normal user (therefore able to be deactivated very rapidly). Based on the probability of scrambling, which varies from 0 to 100%, the technique of an embodiment of the invention makes it possible to achieve this dual purpose.

It is clear that many other embodiments of the invention can be considered.

In an alternative, one of the intermediate actions (for example A3) consists in interrupting the method of detecting scrambling. The detection phases that have not yet been executed are then not executed.

In another alternative the scrambling signals S1 to S5 are transmitted, via the radiocommunication network or via another communication network, to a remote equipment (a monitoring server for example), instead of or in addition to the transmission (internal to the radiocommunication module) to the client application embarked on the radiocommunication module. The remote equipment can as such take this into account in order to take a decision of triggering of at least one intermediate action (for example, triggering an alarm remotely).

At least one embodiment of the invention provides a technique for detecting the scrambling of a radiocommunication network making it possible, for a given number N of radiocommunication channels "that cannot be synchronized" whereon is taken the decision for detecting scrambling (this number N being therefore associated to a probability of scrambling of 100%), to accelerate the making of a decision in the event scrambling is detected and authorize the launching of preventive action(s).

At least one embodiment of the invention provides such a technique making it possible, for the choice of said number N of radiocommunication channels, to be released from the compromise between the reliability of the detecting of scrambling and the rapidity of the decision.

At least one embodiment of the invention provides such a technique that is simple to implement and inexpensive.

Although the present disclosure has been described with reference to one or more examples, workers skilled in the art will recognize that changes may be made in form and detail without departing from the scope of the disclosure and/or the appended claims.

The invention claimed is:

1. A method for detecting scrambling of a radiocommunication network, said method being implemented by a radiocommunication circuit configured to connect to said network by being synchronized on a radiocommunication channel, said method comprising:
   performing a final detection phase, comprising the following steps:
   verifying a final condition by determining if there exists N radiocommunication channels having a power level normally sufficient for synchronization and whereon the radiocommunication circuit cannot synchronize, wherein N is an integer and N≥2;
   in response to the final condition being verified, generating a final scrambling signal with a probability of scrambling equal to 100%; and
   performing at least one intermediate detection phase, comprising the following steps:
   verifying at least one intermediate condition, wherein the at least one intermediate condition is a member of the group consisting of:
   loss of synchronization on all synchronized cells although reception strength levels detected on said cells has not dropped;
   a power level greater than a predetermined threshold for all or at least one predetermined proportion of the radiocommunication channels of which the frequency is comprised in at least one band of operation of the radiocommunication circuit; and
   there exists N' radiocommunication channels whereon said radiocommunication circuit cannot be synchronized despite detection of a power level normally sufficient for being synchronized, wherein N' is an integer and N'<N; and
   in response to the at least one intermediate condition being verified, generating at least one intermediate scrambling signal with a probability of scrambling less than 100%.

2. The method according to claim 1, wherein the intermediate condition comprises:
   loss of synchronization on all synchronized cells although reception strength levels detected on these cells has not dropped.

3. The method according to claim 1, wherein the intermediate condition comprises:
   a power level greater than a predetermined threshold for all or at least one predetermined proportion of the radiocommunication channels of which the frequency is comprised in at least one band of operation of the radiocommunication circuit.

4. The method according to claim 1, wherein the intermediate condition comprises:
   there exists N' radiocommunication channels whereon said radiocommunication circuit cannot be synchronized despite detection of a power level normally sufficient for being synchronized, wherein N is an integer and N'<N.

5. The method according to claim 1, wherein said radiocommunication circuit executes a client application, and wherein said method comprises a step of transmitting to said client application at least one of said intermediate scrambling signals generated by said radiocommunication circuit, so that said client application can take this into account in order to make a decision of triggering of at least one intermediate action.

6. The method according to claim 1, further comprising a step of transmitting to a remote equipment, via said radiocommunication network or via another communication network, at least one of said intermediate scrambling signals generated by said radiocommunication circuit, so that said remote equipment can take this into account in order to make a decision of triggering of at least one intermediate action.

7. The method according to claim 1, wherein said circuit is an electronic radiocommunication module intended to be incorporated into a radiocommunication device.

8. The method according to claim 3, wherein said determined threshold is equal to a minimum power level for synchronization of the radiocommunication circuit.

9. The method according to claim 4, wherein said N' radiocommunication channels are comprised in a last list, received by the radiocommunication circuit, of radiocommunication channels associated to neighboring cells of a last current cell before a loss of synchronization.

10. The method according to claim 9, further comprising:
   at least one further intermediate detection phase, comprising the following steps:
   verifying the following further intermediate condition:
   there exists N" radiocommunication channels whereon said radiocommunication circuit cannot be synchronized despite detection of a power level normally sufficient for being synchronized, wherein N" is an integer and N'<N"<N;
   in response to said further intermediate condition being verified, generating a further intermediate scrambling signal with a further probability of scrambling less than 100% and greater than said first recited probability of scrambling;
wherein said N" radiocommunication channels include:
said N' radiocommunication channels; and
radiocommunication channels that are not included in said last list of radiocommunication channels.

11. The method according to claim 5, wherein at least one particular intermediate action, of which the decision of triggering is a result of a taking into account at least one of said intermediate scrambling signals, comprising interrupting said method before execution of detection phase(s) that are not yet executed, including said final detection phase.

12. A memory device storing a set of instructions that can be executed by a processor of a radiocommunication circuit in order to implement a method for detecting scrambling of a radiocommunication network, said radiocommunication circuit being capable of connecting to said network by being synchronized on a radiocommunication channel, said method comprising:
    performing a final detection phase, comprising the following steps:
    verifying a final condition by determining if there exists N radiocommunication channels having a power level normally sufficient for synchronization and whereon the radiocommunication circuit cannot synchronize, wherein N is an integer and N≥2; in response to the final condition being verified, generating a final scrambling signal with a probability of scrambling equal to 100%; and
    performing at least one intermediate detection phase, comprising the following steps:
    verifying at least one intermediate condition, wherein the at least one intermediate condition is a member of the group consisting of:
    loss of synchronization on all synchronized cells although reception strength levels detected on said cells has not dropped;
    a power level greater than a predetermined threshold for all or at least one predetermined proportion of the radiocommunication channels of which the frequency is comprised in at least one band of operation of the radiocommunication circuit; and
    there exists N' radiocommunication channels whereon said radiocommunication circuit cannot be synchronized despite detection of a power level normally sufficient for being synchronized, wherein N' is an integer and N'<N; and
    in response to the at least one intermediate condition being verified, generating at least one intermediate scrambling signal with a probability of scrambling less than 100%.

13. A radiocommunication circuit, which is configured to detect scrambling of a radiocommunication network, said radiocommunication circuit being configured to connect to said network by being synchronized on a radiocommunication channel, said radiocommunication circuit comprising:
    a memory storing instructions;
    a processor coupled to the memory and configured by the instructions to:
    make a final decision, comprising:
    verifying a final condition by determining if there exists N radiocommunication channels having a power level normally sufficient for synchronization and whereon the radiocommunication circuit cannot synchronize, wherein N is an integer and N≥2; and
    generating a final scrambling signal with a probability of scrambling equal to 100%, activated if said final condition is verified; and
    make an intermediate decision, comprising:
    verifying at least one intermediate condition, wherein the at least one intermediate condition is a member of the group consisting of:
    loss of synchronization on all synchronized cells although reception strength levels detected on said cells has not dropped;
    a power level greater than a predetermined threshold for all or at least one predetermined proportion of the radiocommunication channels of which the frequency is comprised in at least one band of operation of the radiocommunication circuit; and
    there exists N' radiocommunication channels whereon said radiocommunication circuit cannot be synchronized despite detection of a power level normally sufficient for being synchronized, wherein N' is an integer and N'<N; and
    generating an intermediate scrambling signal with a probability of scrambling less than 100%, activated if said at least one intermediate condition is verified.

* * * * *

UNITED STATES PATENT AND TRADEMARK OFFICE
CERTIFICATE OF CORRECTION

PATENT NO.       : 8,565,439 B2                                                                 Page 1 of 1
APPLICATION NO.  : 12/668966
DATED            : October 22, 2013
INVENTOR(S)      : Girard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this
Fifteenth Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,565,439 B2  
APPLICATION NO. : 12/668966  
DATED : October 22, 2013  
INVENTOR(S) : Girard et al.

Page 1 of 1

It is certified that error appears in the above-identified patent and that said Letters Patent is hereby corrected as shown below:

In The Claims

In Claim 12, Column 15, lines 23-30, delete:

"verifying a final condition by determining if there exists N radiocommunication channels having a power level normally sufficient for synchronization and whereon the radiocommunication circuit cannot synchronize, wherein N is an integer and $N \geq 2$; in response to the final condition being verified, generating a final scrambling signal with a probability of scrambling equal to 100%; and"

and insert therefore:

--verifying a final condition by determining if there exists N radiocommunication channels having a power level normally sufficient for synchronization and whereon the radiocommunication circuit cannot synchronize, wherein N is an integer and $N \geq 2$;
in response to the final condition being verified, generating a final scrambling signal with a probability of scrambling equal to 100%; and--.

Signed and Sealed this  
Ninth Day of August, 2016

Michelle K. Lee  
*Director of the United States Patent and Trademark Office*